(12) United States Patent
Heine et al.

(10) Patent No.: US 8,305,685 B2
(45) Date of Patent: Nov. 6, 2012

(54) LOUPE SUPPORT SYSTEM

(75) Inventors: Oliver Heine, Herrsching (DE); Roman Raab, Herrsching (DE); Gerhard Guegel, Diessen (DE); Stefan Knesewitsch, Herrsching (DE); Anton Schneider, Gilching (DE)

(73) Assignee: Heine Optotechnik GmbH & Co KG, Herrsching (DE)

( * ) Notice: Subject to any disclaimer, the term of this patent is extended or adjusted under 35 U.S.C. 154(b) by 386 days.

(21) Appl. No.: 12/784,043

(22) Filed: May 20, 2010

(65) Prior Publication Data

US 2010/0302635 A1 Dec. 2, 2010

(30) Foreign Application Priority Data

May 28, 2009 (DE) .......................... 10 2009 023 049

(51) Int. Cl.
*G02B 25/00* (2006.01)
(52) U.S. Cl. ...................................... 359/481
(58) Field of Classification Search .................... 359/481
See application file for complete search history.

(56) References Cited

U.S. PATENT DOCUMENTS

| 3,592,525 | A | * | 7/1971 | Schultz .......................... 359/481 |
| 4,449,787 | A | | 5/1984 | Burbo et al. |
| 5,667,291 | A | | 9/1997 | Caplan et al. |
| 6,012,827 | A | | 1/2000 | Caplan et al. |
| 2003/0169494 | A1 | * | 9/2003 | Porter et al. ................... 359/409 |

FOREIGN PATENT DOCUMENTS

DE 1044444 11/1958
WO 03/007048 A2 1/2003

* cited by examiner

*Primary Examiner* — Lee Fineman
(74) *Attorney, Agent, or Firm* — Rothwell, Figg, Ernst & Manbeck, P.C.

(57) ABSTRACT

A loupe support system includes a frame (12) which can be mounted at the head of a user and at which a holding device (18) is mounted, an elongated support element (30, 31, 68) which, at its central region, is supported at the holding device (18) such that it can rotate about its longitudinal central axis, wherein a respective loupe ocular (34) is mounted at the support element (30, 31, 68) on each of both sides of the holding device, and a light mounting element (22) supported at the holding device (18) such that it can rotate about a rotary axis being coaxial with respect to the longitudinal central axis of the support element (30, 31, 68).

8 Claims, 5 Drawing Sheets

LOUPE SUPPORT SYSTEM

CROSS-REFERENCE TO RELATED APPLICATION

This application claims benefit of German Patent Application 10 2009 023 049. 1, filed May 28, 2009, the disclosure of which is incorporated herein in its entirety by reference.

BACKGROUND OF THE INVENTION

1. Field of the Invention

The invention relates to a loupe support system comprising a frame which can be mounted at the head of a user and at which one end of a holding device is mounted, and an elongated support element which, at its central region, is supported at the holding device such that it can rotate about its longitudinal central axis, wherein a respective loupe ocular is mounted at the support element on each of both sides of the holding device, and a light mounting element at which a light can be mounted and which is supported at the holding device such that it can rotate.

2. Description of the Background Art

A loupe support system of this kind is known from WO 03/007048 A2. In the case of this loupe support system there is provided a tab which can be attached to the bridge of a pair of spectacles such that it can pivot about a pivot axis. A saddle is slidably arranged on the tab, wherein an elongate support element is arranged at the bottom side of the saddle and wherein at both sides of the tab there is a respective loupe ocular fastened to the support element. The distance between the loupe oculars and the eyeglasses can be adjusted by means of the slidable saddle. Furthermore, the loupe oculars can be pivoted about a longitudinal axis of the support element. At the top side of the saddle there is a light mounting element pivotally mounted, to which a light is attached.

In the case of the known loupe support system it is not possible to mount the light and the loupe oculars on a congruent illumination axis. For this reason, shadowless lighting of long and small drillings, such as root canal drillings, is not possible.

SUMMARY OF THE INVENTION

The object of the invention is to create a loupe support system enabling simple and lasting adjustment of loupe oculars and light as well as shadowless lighting.

This object is achieved by a loupe support system comprising a frame on which a holding device is mounted, an elongated support element having a longitudinal central axis and a central region, said elongated support element being supported at said central region on said holding device such that it can rotate about a first rotary axis being coaxial to said longitudinal central axis, wherein a respective loupe ocular is mounted at the support element on each of both sides of said holding device, and a light mounting element supported at said holding device such that it can rotate about a second rotary axis being coaxial to said longitudinal central axis of said support element.

In the loupe support system according to the present invention the light mounting element is supported such that it can rotate about a rotary axis being coaxial with respect to the rotary axis of the support element. This makes it possible to arrange the loupe oculars and a light such that their optical axes lie in one plane, whereby shadowless lighting even of small drillings is possible. The light and the loupe ocular may be pivoted together or separately from one another.

In order to make sure that the loupe support system and the light remain in their respective rotary position, it is advantageous to provide a clamping device.

In a preferred embodiment of the invention, the clamping device is formed by providing, at the other end of the holding device, a sleeve portion, in which at both sides thereof a cylindrical space being coaxial with respect to the longitudinal central axis of the support element is formed, the cylindrical space extending up to the respective end side of the sleeve portion and being limited within the sleeve portion by a cylinder bottom, wherein the cylinder bottoms are spaced apart from one another, whereby a clearance is formed in the sleeve portion. A circumferential slot is formed over a partial area of the outer circumference of the sleeve portion, the circumferential slot opening up into the clearance. In the clearance there is a disk element arranged such that it can rotate, wherein at the outer circumference of the disk element there is a projection formed extending through the circumferential slot outwardly, wherein at the projection there is provided outside of the sleeve portion a fastening device for fastening a light. In the cylinder bottoms and the disk element there are provided coaxial through holes, through which an axle extends. Both ends of the axle are each connected to one end of a support portion of the support element such that they are fixed against rotation. In the cylindrical spaces adjacent the respective cylinder bottoms there is provided a respective pressure disk surrounding the axle, at which at least one pressure projection is provided extending in the axial direction through a corresponding through hole in the cylinder bottom and engaging the disk element. A resilient device is provided in the cylindrical space, one end of which engages the end side of the corresponding support portion facing the resilient device, wherein the other end engages the pressure disk.

The clamping device formed in this way requires very little space. Moreover, this constructional design ensures that the clamping force remains constant even after a multitude of adjustments of the loupe ocular and the light.

Preferably, the resilient device is formed by a disk spring package through which the axle extends.

For good sealing between the sleeve portion and the support portions, the end of each support portion extending into the cylindrical space is preferably formed by a cylindrical portion which is adjoined by a cylindrical collar, the outer diameter of which is larger than the outer diameter of the cylindrical portion and corresponds to the inner diameter of the cylindrical space. At the cylindrical portion there is arranged a ring seal engaging the cylindrical portion and the inner wall of the cylindrical space.

In order to adjust the distance of the loupe oculars, they are advantageously mounted such that they can slide in the longitudinal direction of the support element.

For optimal illumination, a light can be mounted at the light mounting element such that the optical axis of the light lies in the plane of the optical axes of the loupe oculars. The convergence of the loupe oculars is preferably adjusted such that the three optical axes intersect at an optimal distance in front of a user's eye amounting to about 200 to 600 mm. Thereby the field of view can be optimally illuminated so that shadowless lighting even of long narrow drillings is possible.

Preferably the holding device has a pivoting bracket, one end of which is articulated at the frame, and comprises a connecting arm, one end of which is articulated at the other end of the pivoting bracket.

The frame is preferably an eyeglass frame, wherein the holding device is mounted at the bridge of the eyeglass frame.

BRIEF DESCRIPTION OF THE DRAWINGS

An exemplary embodiment of the invention is hereinafter explained in more detail by way of drawings, in which.

DETAILED DESCRIPTION OF THE INVENTION

Figure 1:
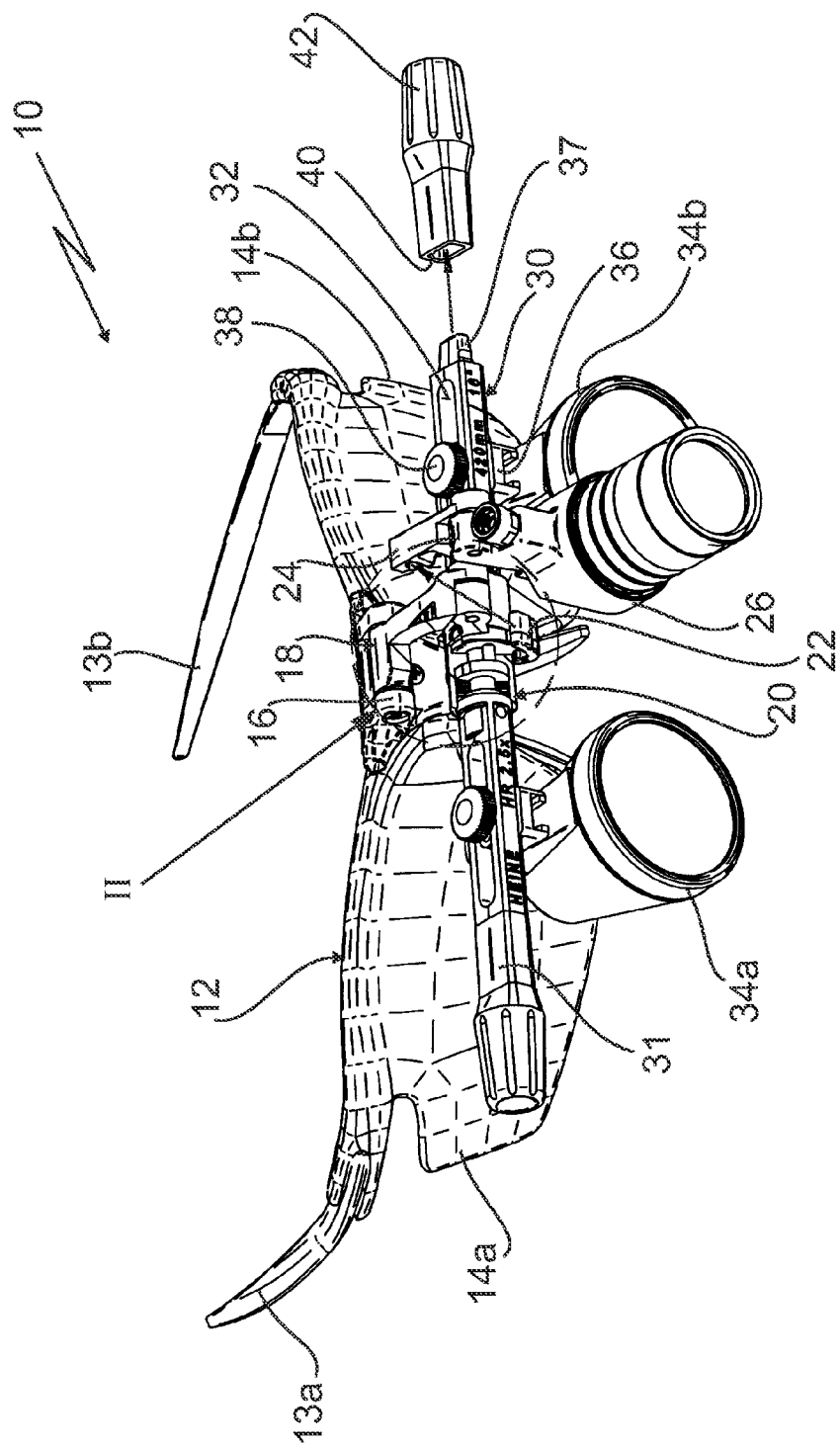
FIG. 1 is a perspective view of a loupe support system.

The loupe support system 10 shown in FIG. 1 comprises an eyeglass frame 12 having two temples 13a, 13b and two eyeglasses 14a, 14b connected through a bridge 16. At the bridge 16 there is mounted a holding device 18 having a pivoting bracket 50, one end of which is articulated at the bridge 16 pivotably about a horizontal axis. At the other end of the pivoting bracket 50 there is a connecting arm 52 articulated also in a rotatable manner about a parallel horizontal axis. A sleeve portion 54 is mounted at the end of the connecting arm 52 opposite the hinge point, the longitudinal center line of the sleeve portion 54 being parallel to both of the pivoting axes. In the sleeve portion 54 a support element is supported such that it can rotate about the longitudinal center axis of the sleeve portion 54, the support portion comprising of a left support portion 31 and a right support portion 30 as well as an axle 68 extending centrally through the sleeve portion 54 and connecting the two support portions 30, 31 in a rotatably fixed manner. The support portions 30, 31 have, in their middle area, a rectangular cross section, in each of which a longitudinal recess 32 is formed extending in the longitudinal direction and reaching from top to bottom through the support portions 30, 31. A fastening device 36 is led in the longitudinal recesses 32 such that it can slide in the longitudinal direction, wherein at the bottom end of the fastening device 36 a loupe ocular 34a and 34b, respectively, is attached. The position of the loupe oculars 34a, 34b can be fixed by a knurled screw 38 engaging in the fastening device 36 and pressing onto the top of the support portions 30, 31. Projections 37 are provided at the ends of the support portions 30, 31, which projections 37 engage in recesses 40 of rotary handles 42, which are releasably attached to the ends of the support portions 30, 31 and through which the support portions 30, 31 can be adjusted together with the axle 68 for a rotational adjustment of the loupe oculars 34a, 34b. The rotary handles 42 can be removed, so that they may be sterilized.

A disk element 60 is supported in the center of the sleeve portion 54 such that it can rotate about the axle 68 having a projection 62 which passes through a circumferential slot 65 in the sleeve portion 54 and at which there is provided outside of the sleeve portion 54 a mount 74 at which a connecting arm 24 can be fixed at which a light 26 is mounted.

Figure 2:
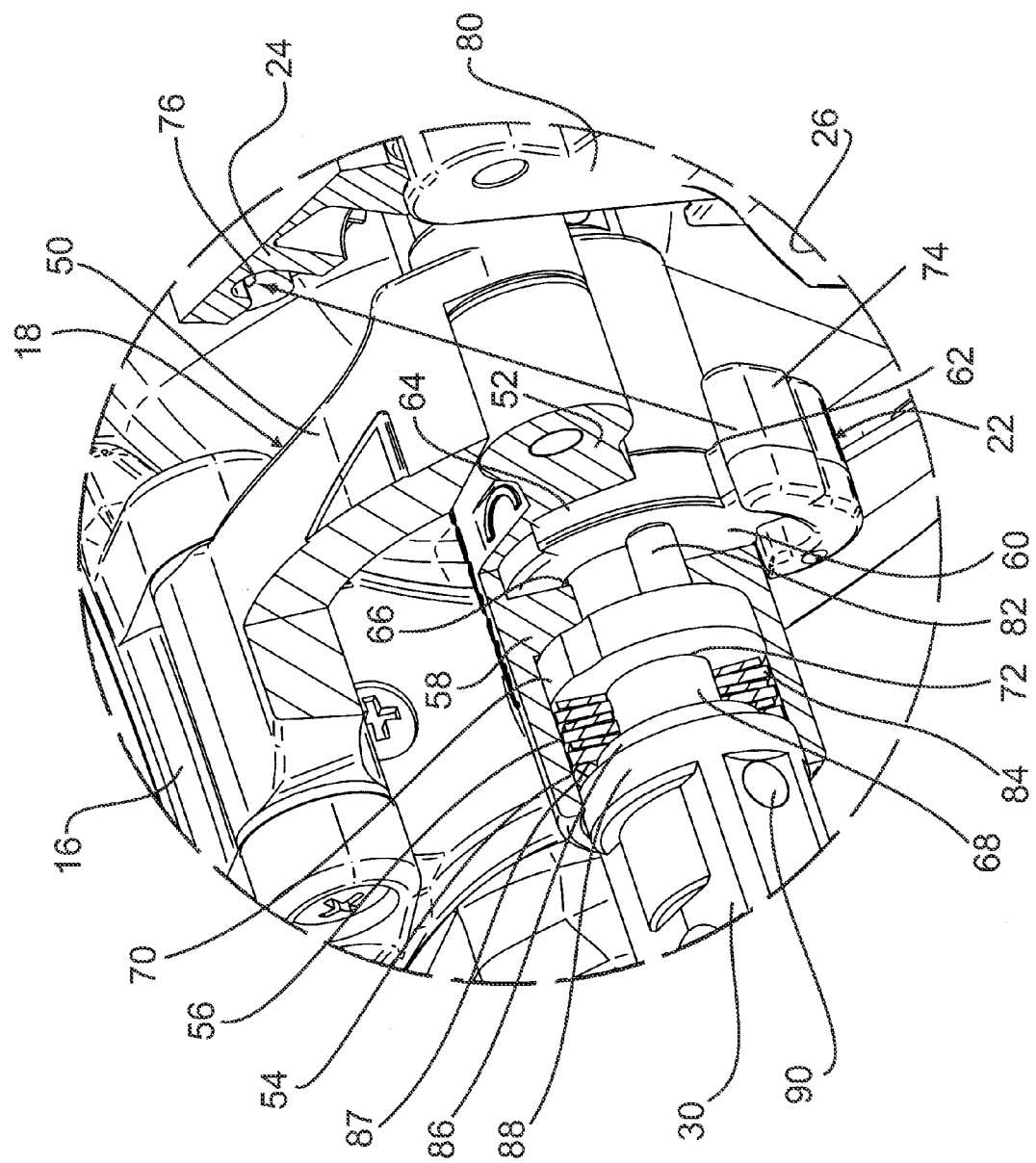
FIG. 2 shows the detail II of FIG. 1.
Figure 3:
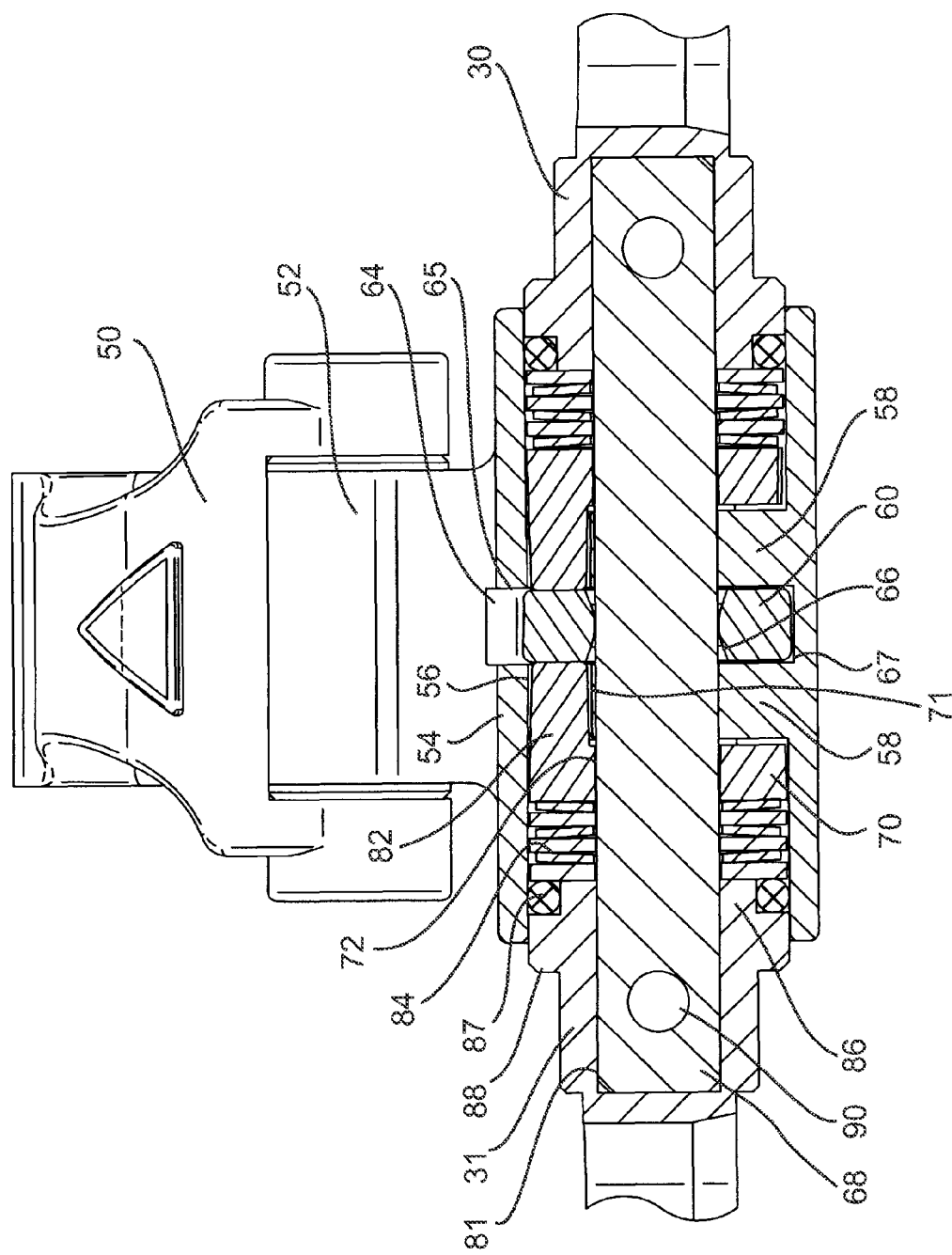
FIG. 3 shows a clamping device of the loupe support system of FIG. 1.

FIGS. 2 and 3 show in detail how the support portions 30, 31 and the disk element 60 are rotationally supported by means of a clamping device. Since the support portions 30 and 31 are supported in the same manner, the way they are supported it is mainly explained by means of the way the support portion 31 is supported.

The sleeve portion 54 has, at both of its end sides, a cylindrical space 56 opening in the respective end side. Both cylindrical spaces 56 are limited inside the sleeve portion 54 by a cylinder bottom 58. Both cylinder bottoms 58 are spaced apart from one another, forming a clearance 67 between the cylinder bottoms 58. In the clearance 67 there is the disk element 60 arranged, the width of which corresponds to the width of the clearance 67. Moreover, in the disk element 60 there is a central through hole 66 provided, through which the axle 68 extends. The diameter of the disk element 60 in general corresponds to the inner diameter of the sleeve portion 54. From the outer circumference of the disk element 60 a stopper portion 64 extends at an angle of approximately 170° about the circumference of the disk element 60, through which the rotary movement of the disk element 60 is limited by a strike on the ends of the slot 65 such that a rotation of the disk element of about 90° is possible. In front of the stopper portion 64 there is a projection 62 extending outwardly, at which the mount 74 is provided, wherein the connecting arm 24 for the light 26 can be fastened at the mount 74.

Figure 4:
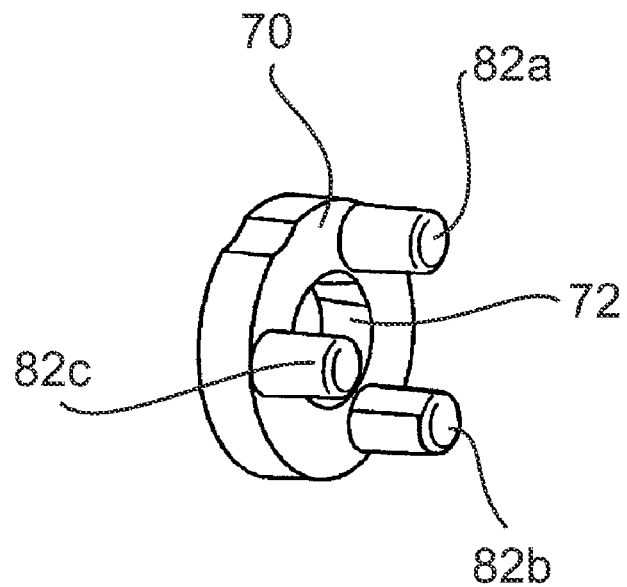
FIG. 4 shows a pressure disk of the clamping device of FIG. 3.
Figure 5:
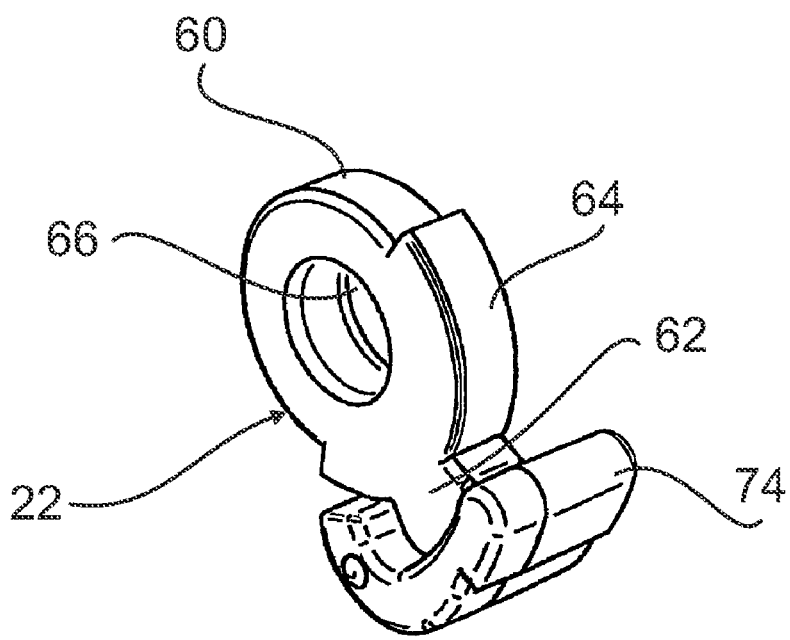
FIG. 5 shows a disk element of the clamping device of FIG. 3.

Adjacent the outside of each of the cylinder bottoms 58 there is a respective pressure disk 70 arranged, the outer diameter of which substantially corresponds to the inner diameter of the sleeve portion 54 and which has a central through hole 72, through which the axle 68 extends. As can be seen in FIG. 4 three pins 82a, 82b, 82c are arranged at an even angular distance of 120° and extend from the side of the pressure disk 70 facing the respective cylinder bottom 58 towards the pressure disk 70. The pins 82a, 82b, 82b each extend through a through hole 71 in the cylinder bottom 58 and with their free ends abut on the respective side of the disk element 60. Positive locking is created between the cylinder bottom 58 and the pressure disk 70 through the pins 82a, 82b, 82c, preventing rotation of the pressure disk 70. Due to the sectional representation in FIG. 3 only one pressure projection 82 can be seen.

There is a respective disk spring package 84 abutting on the outside of each pressure disk 70, wherein the axle 68 also extends through the disk spring package 84. The disk spring package 84 presses, on the side opposite the pressure disk 70, against the end side of a cylindrical portion 86 of the support portions 31 and 30, respectively, wherein the outer diameter of the cylindrical portion 86 is smaller than the inner diameter of the sleeve portion 54. A collar 88, the outer diameter of which corresponds to the inner diameter of the sleeve portion 54, adjoins the cylindrical portion 86, whereby the support portion 30, 31 is supported such that it can rotate in the sleeve portion 54. In the support portions 30, 31 a central middle opening 81 is formed into which the respective end of the axle 68 is inserted. Through a bolt 90 extending transversely through the axle 68 and the support portion 31 the axle 68 and the support portions 30, 31 are connected such that they are fixed against rotation. In the step of the transition between the cylindrical portion 86 and the collar 88 there is a ring seal 87 arranged pressing against the cylindrical portion 86 and the inner wall of the sleeve portion 54 in order to seal the inner space of the sleeve portion 54.

By means of the disk spring package 84 pressure is exerted against the support portions 30, 31 as well as against the pressure disk 70, which in turn exerts pressure upon the disk element 60 through the pressure projections 82a, 82b, 82c.

Thereby it is ensured that during a common rotation of the support portions 30, 31 to adjust the loupe oculars 34a, 34b the support portions 30 and 31, respectively, remain in their rotary position. Since pressure is also exerted on the disk element 60, at which the light 26 is fastened, the light 26, too, remains in its respective rotary position.

Figure 6:
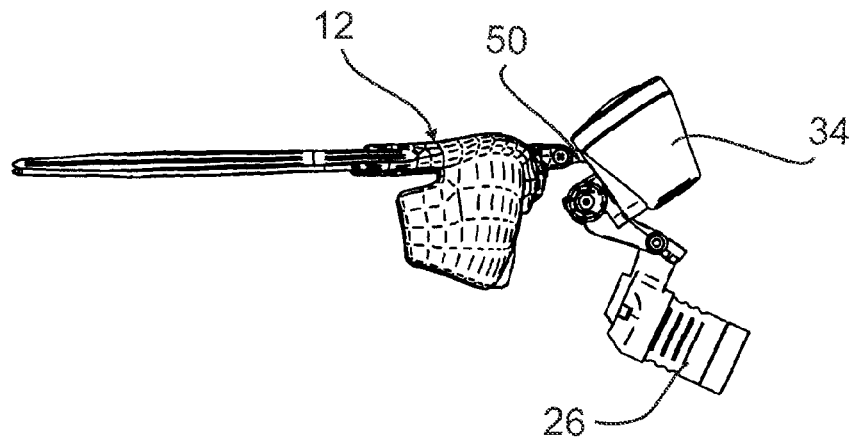
FIG. 6 is a side view of the loupe support system of FIG. 1 with loupe oculars folded up.
Figure 7:
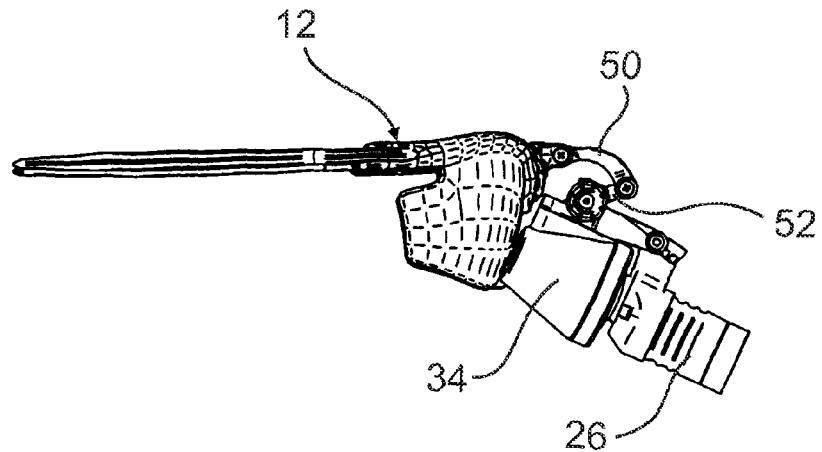
FIG. 7 is the side view of FIG. 6 with loupe oculars folded down in a first pivoted position.
Figure 8:
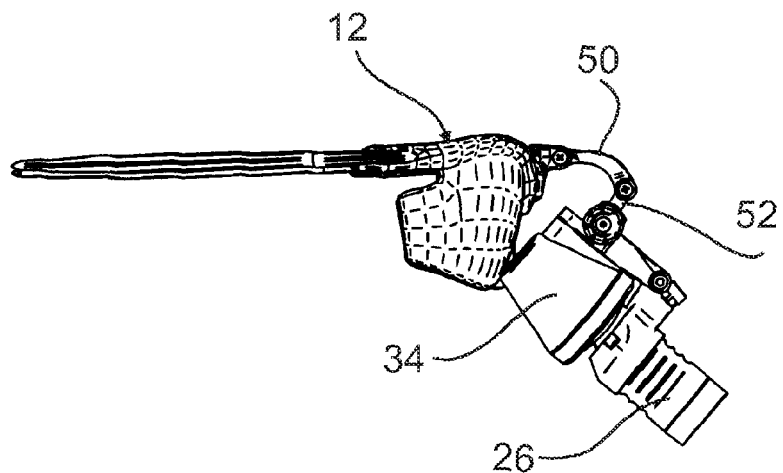
FIG. 8 is the side view of FIG. 6 with loupe oculars folded down in a second pivoted position.

Different rotary positions of the light 26 and the loupe oculars 34 are shown in FIGS. 6 to 8. In FIG. 6 the loupe oculars 34 are folded up. In this position the user can look at an object illuminated by the light 26 only through the eyeglasses 14a, 14b. If an object is to be looked at through the loupe oculars 34, the loupe oculars 34 are folded down independently of the light 26. As can be seen in FIG. 7, the optical axes of the loupe oculars 34 and the light 26 lie in one plane. The convergence of the loupe oculars 34 can furthermore be adjusted such that the optical axes intersect, so that an object can be looked at in full illumination, wherein the crossing point of the optical axes is preferably at a distance of 200 to 600 mm in front of a user's eye. Finally it is possible to pivot the loupe oculars 34 and the light 26 together about the central axis of the sleeve portion 54, such as, for example, downwards from the position shown in FIG. 7 into the position shown in FIG. 8.

The invention claimed is:

1. A loupe support system comprising
a frame on which a holding device is mounted;
an elongated support element having a longitudinal central axis and a central region, said elongated support element being supported at said central region on said holding device such that it can rotate about a first rotary axis being coaxial to said longitudinal central axis, wherein a respective loupe ocular is mounted at the support element on each of both sides of said holding device; and
a light mounting element supported at said holding device such that it can rotate about a second rotary axis being coaxial to said longitudinal central axis of said support element, wherein
at said holding device a sleeve portion is provided, at both sides of which a corresponding cylindrical space being coaxial with respect to said longitudinal central axis of the support element is formed, each cylindrical space opening in an respective end side of said sleeve portion and being limited within said sleeve portion by a cylinder bottom, wherein said cylinder bottoms are spaced apart from one another, whereby a clearance is formed in said sleeve portion;
a circumferential slot is formed over a partial area of the outer circumference of said sleeve portion, said circumferential slot opening into said clearance;
in said clearance a disk element is arranged such that it can rotate, wherein at an outer circumference of said disk element a projection is formed extending through said circumferential slot outwardly, wherein at said projection a fastening device for fastening a light is provided outside of said sleeve portion;
in said cylinder bottoms and said disk element coaxial through holes are provided, through which an axis having a first and a second end extends;
said first and second ends of said axis are each connected to one corresponding end of a support portion of said support element such that they are fixed against rotation;
in each of said cylindrical spaces a respective pressure disk surrounding said axis is arranged adjacent a corresponding cylinder bottom, at least one pressure projection being provided on the pressure disk such that it extends in an axial direction parallel to said longitudinal central axis through a corresponding through hole in a corresponding cylinder bottom and engages said disk element; and
a resilient device is provided in each cylindrical space, one end of said resilient device engaging an end side of a corresponding support portion facing said resilient device, wherein the other end engages said pressure disk.

2. The loupe support system according to claim 1, wherein a clamping device is provided which is formed and arranged such that said elongated support element and said light mounting element each remain in a respective rotary position after having been rotated.

3. The loupe support system according to claim 1, wherein said resilient device is formed by a disk spring package through which said axis extends.

4. The loupe support system according to claim 1, wherein an end of each of said support portions extending into a corresponding one of said cylindrical spaces is formed by a cylindrical portion which is adjoined by a cylindrical collar, the outer diameter of said cylindrical collar is larger than the outer diameter of said cylindrical portion and corresponds to the inner diameter of said cylindrical space, and wherein at said cylindrical portion a ring seal is arranged which engages said cylindrical portion and the inner wall of said cylindrical space.

5. The loupe support system according to claim 1, wherein said loupe oculars are mounted such that they can slide in the longitudinal direction of said support element.

6. The loupe support system according to claim 1, wherein a light is mounted at said light mounting element such that the optical axis of said light lies in the plane of the optical axes of said loupe oculars.

7. The loupe support system according to claim 1, wherein said holding device comprises a pivoting bracket, one end of which is articulated at said frame, and a connecting arm, one end of which is articulated at the other end of the pivoting bracket.

8. The loupe support system according to claim 1, wherein said frame is an eyeglass frame having a bridge, wherein said holding device is mounted at said bridge.

* * * * *